United States Patent
Levert et al.

(10) Patent No.: US 6,318,806 B1
(45) Date of Patent: Nov. 20, 2001

(54) VEHICLE SEAT HAVING A PIVOT MECHANISM

(75) Inventors: Emmanuel Levert; Franck Lepaule, both of Flers (FR)

(73) Assignee: Bertrand Faure Equipements SA, Boulogne (FR)

(*) Notice: Subject to any disclaimer, the term of this patent is extended or adjusted under 35 U.S.C. 154(b) by 0 days.

(21) Appl. No.: 09/451,236

(22) Filed: Nov. 29, 1999

(30) Foreign Application Priority Data

Dec. 1, 1998 (FR) .................................................. 98 15129

(51) Int. Cl.[7] ...................................................... B60N 2/22
(52) U.S. Cl. .................................................................. 297/367
(58) Field of Search ............................................... 297/367

(56) References Cited

U.S. PATENT DOCUMENTS

| | | | | |
|---|---|---|---|---|
| 5,156,439 | * | 10/1992 | Idlani et al. | 297/367 |
| 5,383,710 | * | 1/1995 | Premji | 297/367 X |
| 5,611,599 | * | 3/1997 | Baloche et al. | 297/367 |
| 5,755,491 | * | 5/1998 | Baloche et al. | 297/367 X |

FOREIGN PATENT DOCUMENTS

| | | |
|---|---|---|
| 42 09 391 | 10/1992 | (DE) . |
| 0 260 849 | 3/1988 | (EP) . |
| 1 569 654 | 6/1969 | (FR) . |
| 2 759 333 | 8/1998 | (FR) . |
| 1 237 796 | 6/1971 | (GB) . |

* cited by examiner

Primary Examiner—Peter M. Cuomo
Assistant Examiner—Rodney B. White
(74) Attorney, Agent, or Firm—Marshall, Gerstein, & Borun

(57) ABSTRACT

A vehicle seat comprises a backrest mounted on a seat by means of a pivot mechanism comprising two flanges fixed respectively to the seat and the backrest and linked one to the other by means of a single-train hypocycloid gear mechanism which causes the backrest to pivot about an axis of rotation which in turn moves in circular translation about a fixed axis. The gear mechanism is driven by a control shaft which is centered on the axis of rotation on a level with said gear mechanism and which has a part forming a crank comprising an end centered on the fixed axis, which end is driven in rotation by an electric motor mounted on the seat part.

5 Claims, 2 Drawing Sheets

VEHICLE SEAT HAVING A PIVOT MECHANISM

FIELD OF THE INVENTION

The present invention relates to vehicle seats having pivot mechanisms.

More specifically, the invention relates to a vehicle seat having first and second parts mounted so as to pivot relative to one another by means of a first pivot mechanism comprising:

a single-train hypocycloid gear mechanism, this gear mechanism comprising first and second annular toothed gears meshing one with the other and joined respectively to the first and second parts of the seat, the first and second sets of teeth being arranged so that one extends radially towards the exterior and the other radially towards the interior and said first and second teeth respectively have first and second transverse horizontal central axes, offset one from the other, a cam mounted so as to rotate on the one hand relative to the first set of teeth about the first axis and on the other relative to the second set of teeth about the second axis in order to drive the first and second sets of teeth in relative rotation, and a control shaft which is joined to the cam and which is centered on the second axis on a level with said cam.

BACKGROUND OF THE INVENTION

Document FR-A-2 759 333 describes an example of such a seat which is satisfactory but whose pivot mechanism is more specifically designed to be manually operated.

However, electrical operation of a pivot mechanism of this type gives rise to a problem if it is desirable to mount the electric motor activating the pivot mechanism on the first part of the seat (especially if said first part is the seat part of the seat).

In effect, the control shaft is not fixed relative to the first part of the seat but instead is subjected to a nutating movement, i.e. not only does it rotate on itself about its central axis, there is also circular movement of said central axis in translation.

This nutating motion is not compatible with providing a simple mechanical connection between the control shaft and the electric motor.

OBJECTS AND SUMMARY OF THE INVENTION

The specific objective of the present invention is to overcome this disadvantage.

To this end, the invention proposes a pivot mechanism of the type in question, in which the control shaft has a part forming a crank, comprising an activating member which is centered on the first axis and which is driven in rotation by an electric motor mounted on the first part of the seat.

As a result of these features, a simple, mechanical connection can be provided between the electric motor and the part of the control shaft serving as the crank since the activating member of this crank section is subjected purely to a rotating motion.

For the preferred embodiments of the invention, one and/or other of the following features may be incorporated:

the control shaft is provided as a single piece, the part of this shaft forming the crank being an elbow portion belonging to said shaft and the activating member of this crank part being a shaft section extending along the first axis;

the seat also has a second pivot mechanism comprising:

at least one single-train hypocycloid gear mechanism, this gear mechanism in turn comprising first and second annular sets of teeth meshing one with the other and joined respectively to the first and second parts of the seat, the first and second sets of teeth of the second pivot mechanism being directed radially one towards the exterior and the other radially towards the interior and said first and second sets of teeth of said second pivot mechanism being centered respectively on the first and second axes, a cam mounted so as to rotate relative to the sets first teeth of the second pivot mechanism about the first axis and relative to the second teeth of the second pivot mechanism about the second axis in order to produce a relative rotation between the first and second teeth of the second pivot mechanism, the two pivot mechanisms being arranged respectively at either side of the seat, the control shaft extending horizontally between these two pivot mechanisms, this control shaft being joined to the cam of the second pivot mechanism and being centered on the second axis on a level with said cam and between the two pivot mechanisms, and said control shaft crossing through the first pivot mechanism so as to project towards the exterior as far as the part forming the crank;

the first and second parts of the seat comprise respectively a seat and a backrest;

BRIEF DESCRIPTION OF THE DRAWINGS

Other features and advantages of the invention will become clear from the following description of one of its embodiments, given by way of example and not restrictive in any respect, and with reference to the appended drawings.

Of the drawings:

FIG. 3 is a partial view in axial section of one of the pivot mechanisms of the device illustrated in FIG. 2, and FIG. 4 is a view in section along the line IV—IV of FIG. 3.

MORE DETAILED DESCRIPTION

The same references are used in the different drawings to denote identical or similar elements.

Figure 1:
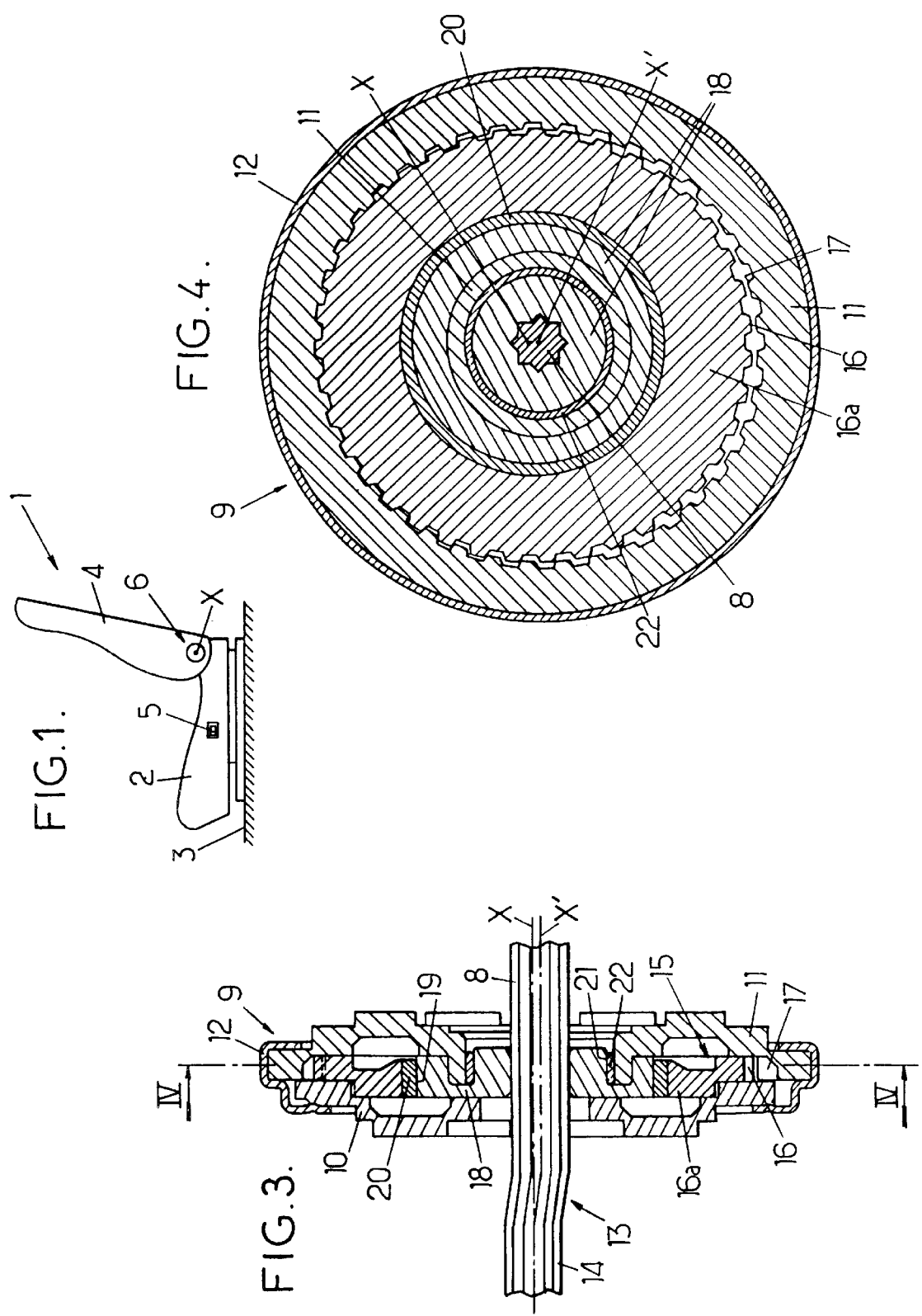
FIG. 1 is a schematic view of one embodiment of a seat for a motor vehicle as proposed by the invention.

FIG. 1 illustrates a front seat 1 of a motor vehicle which has, on the one hand a seat 2 mounted on the floor 3 of the vehicle and on the other a backrest 4 which is mounted so as to pivot on the seat about a horizontal transverse axis X.

Figure 2:
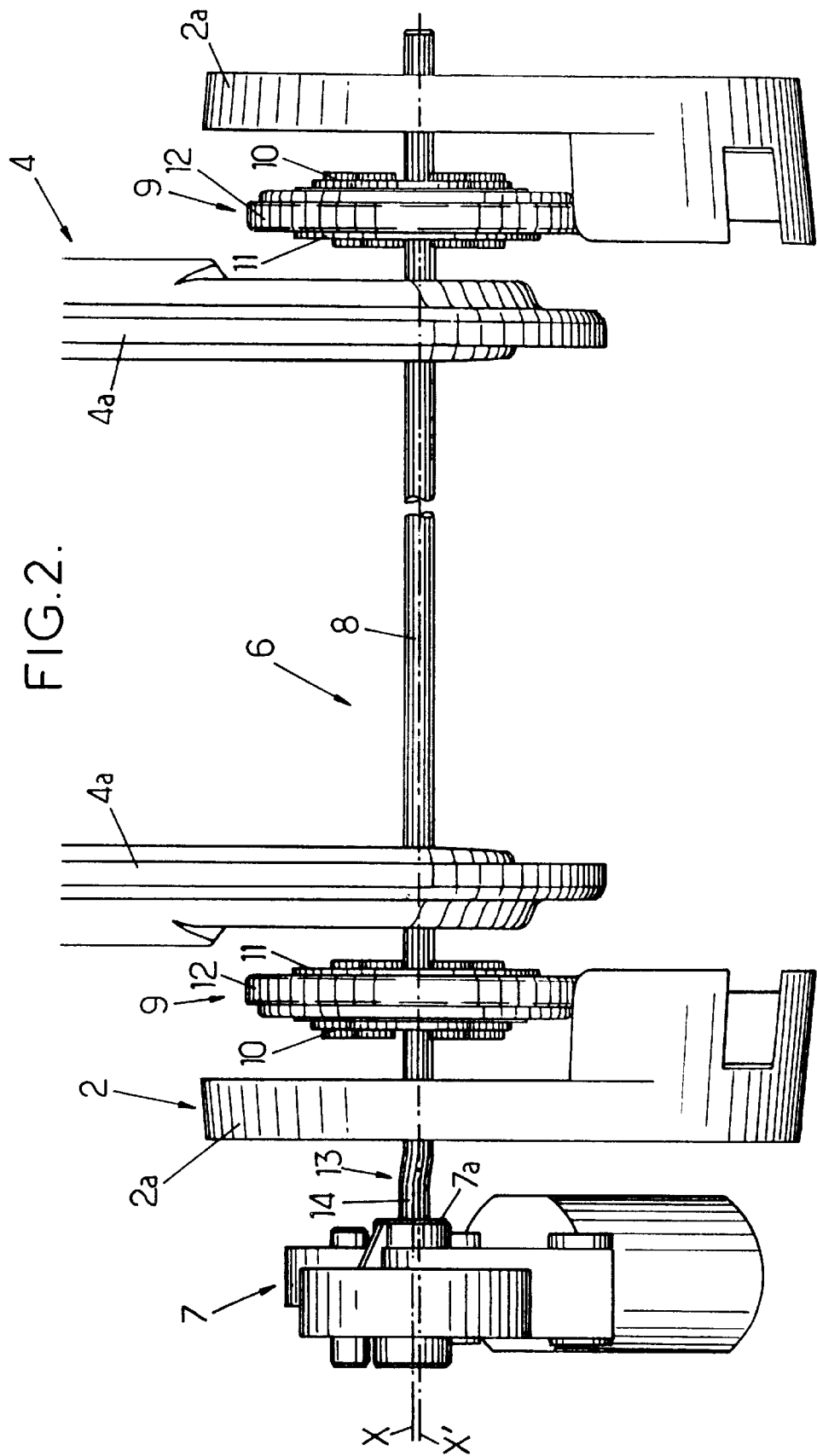
FIG. 2 is a partial exploded view of the device enabling the inclination of the backrest of the seat illustrated n FIG. 1 to be adjusted.

The inclination of the backrest 4 can be adjusted by means of an electric button 5 which controls a device for adjusting the inclination 6 comprising an electric gear motor 7 illustrated in FIG. 2.

The gear motor 7 drives a horizontal transverse splined control shaft 8 in rotation, which in turn controls two identical pivot mechanisms 9 arranged at either side of the seat.

Each pivot mechanism 9 comprises a single-train hypocycloid gear mechanism which will be described in more detail below and which, in the particular example discussed here, is contained in a closed circular housing consisting of:

a disc-shaped mobile metal flange 10 which extends perpendicular to the axis X and which is joined to the frame 2a of the seat part, a disc-shaped mobile metal flange 11 which also extends perpendicular to the axis X and which is joined to the frame 4a of the backrest, and a crimpled metal ring 12 which holds the flanges 10, 11 one against the other, closing off the housing containing the hypocycloid gear mechanism.

Furthermore, the control shaft 8 extends across the entire width of the seat and crosses through the two pivot mechanisms 9. Between the two pivot mechanisms 9, the control shaft 8 extends in a straight line and is centered on an axis X' parallel with the axis X mentioned above but slightly offset from this axis X (the distance between the axes X and X' may be between 1 and 2 mm, for example).

In addition, the control shaft is extended beyond one of the pivot mechanisms 9 towards the exterior of the seat by a part 13 forming a crank. This part 13 forming a crank consists of an elbow section of the shaft 8, which elbow section terminates with an end section 14 centered on the axis X.

In the example illustrated in FIGS. 3 and 4, each pivot mechanism 9 has a hypocycloid gear mechanism 15 which comprises:

a first set of teeth 16 which is centered on the axis X and which is oriented radially towards the exterior, this first set of teeth being joined to the fixed flange 10 and, in the specific example illustrated here, said first set of teeth is provided on a metal pinion 16a which is rigidly fixed on the inner face of the flange 10 (as described in document FR-A-2 759 333 mentioned above), a second set of teeth 17 which, in this example, is formed on the inner face of the mobile flange 11 and which meshes with the first set of teeth 16, this second set of teeth being oriented radially towards the interior and having an internal diameter greater than the external diameter of the first set of teeth, and said second set of teeth being centered on the axis X'.

Finally, each pivot mechanism 9 also has a rigid metal cam 18, which extends perpendicular to the axis X and which is joined to the shaft 8, this cam having at least two cylindrical surfaces in rotation, namely on the one hand a first cylindrical surface 19, which is centered on the axis X and which pivots in a bearing 20 joined to the fixed flange 10, and on the other a second cylindrical surface 21 which is centered on the axis X' and which pivots in a bearing 22 joined to the mobile flange 11.

Accordingly, the rotation of the shaft 8 drives the cam 18 in rotation, which in turn causes the flange 11 to rotate about the axis X' in a nutating motion relative to the flange 10, i.e. with a circular translation of the axis X' about the axis X.

Due to the fact that the end section 14 of the crank part 13 is centered on the axis X, this end section is subjected solely to a movement in rotation relative to the frame of the seat part and relative to the gear motor 7.

As illustrated in FIG. 2, the end section 14 may therefore be connected to the gear motor 7 in a very simple manner, it being simply inserted in the rotating output member 7a of the gear motor 7.

We claim:

1. A vehicle seat comprising first and second parts mounted so as to pivot relative to one another by means of a first pivot mechanism comprising:

a single-train hypocycloid gear mechanism, this gear mechanism comprising first and second annular sets of teeth meshing one with the other and joined respectively to the first and second parts of the seat, the first and second sets of teeth being arranged so that one extends radially towards the exterior and the other radially towards the interior and said first and second teeth respectively have first and second transverse horizontal central axes, offset one from the other, a cam mounted so as to rotate on the one hand relative to the first set of teeth about the first axis and on the other relative to the second set of teeth about the second axis in order to drive the first and second sets of teeth in relative rotation, and a control shaft which is joined to the cam and which is centered on the second axis on a level with said cam, wherein the control shaft has a part forming a crank, comprising an activating member which is centered on the first axis and which is driven in rotation by an electric motor on the first part of the seat.

2. A vehicle seat as claimed in claim 1, in which the control shaft is provided as a single piece, the part of this shaft forming the crank being an elbow portion belonging to said shaft and the activating member of this crank part being a section of shaft extending along the first axis.

3. A vehicle seat as claimed in claim 1, also having a second pivot mechanism comprising:

at least one single-train hypocycloid gear mechanism, this gear mechanism in turn comprising first and second annular toothed gears meshing one with the other and joined respectively to the first and second parts of the seat, the first and second sets of teeth of the second pivot mechanism being directed radially one towards the exterior and the other radially towards the interior and said first and second teeth of said second pivot mechanism being centered respectively on the first and second axes, a cam mounted so as to rotate on the one hand relative to the first set of teeth of the second pivot mechanism about the first axis and on the other relative to the second set of teeth of the second pivot mechanism about the second axis in order to produce a relative rotation between the first and second sets of teeth of the second pivot mechanism, the two pivot mechanisms being arranged respectively at either side of the seat, the control shaft extending horizontally between these two pivot mechanisms, this control shaft being joined to the cam of the second pivot mechanism and being centered on the second axis on a level with said cam and between the two pivot mechanisms, and said control shaft crossing through the first pivot mechanism so as to project towards the exterior as far as the part forming the crank.

4. A seat as claimed in claim 1, in which the first and second parts of the seat comprise respectively a seat part and backrest.

5. A seat as claimed in claim 4, in which the electric motor is fixed to the seat part.

* * * * *